L. J. WILLIAMS & F. C. MYRICK.
STAKING TOOL.
APPLICATION FILED MAY 28, 1908.
1,045,487.
Patented Nov. 26, 1912.
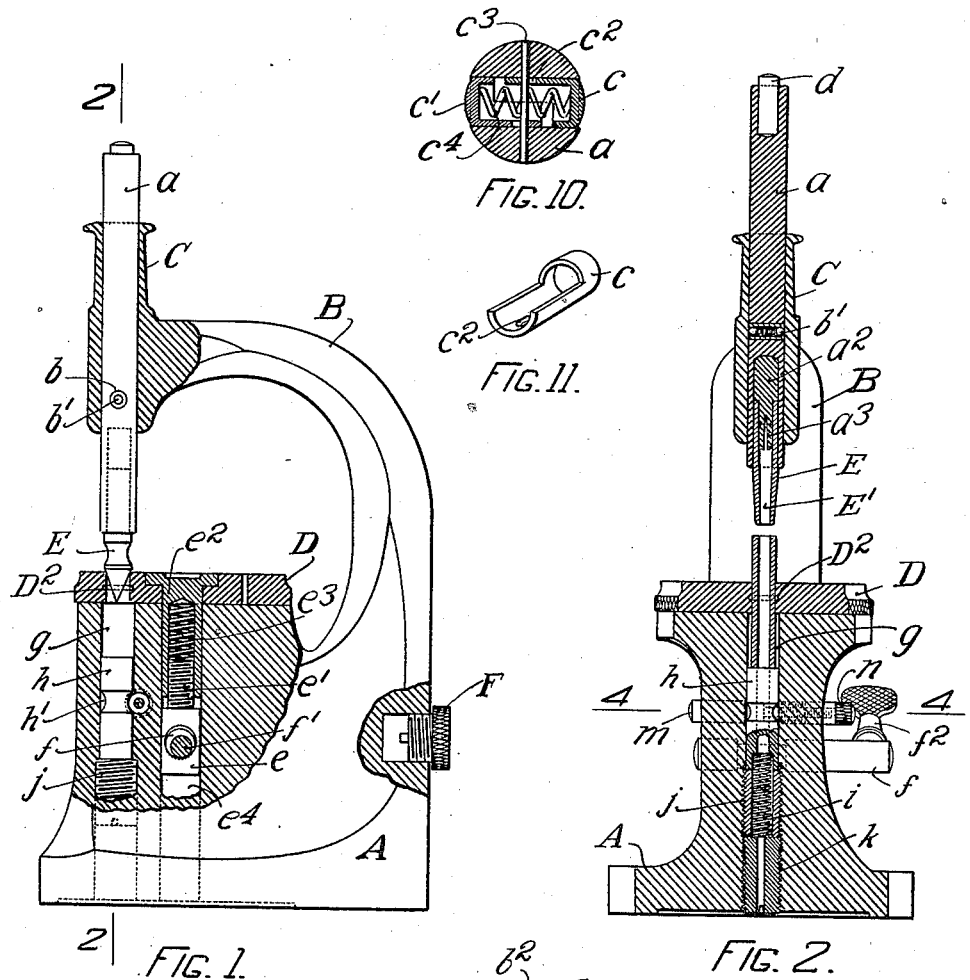
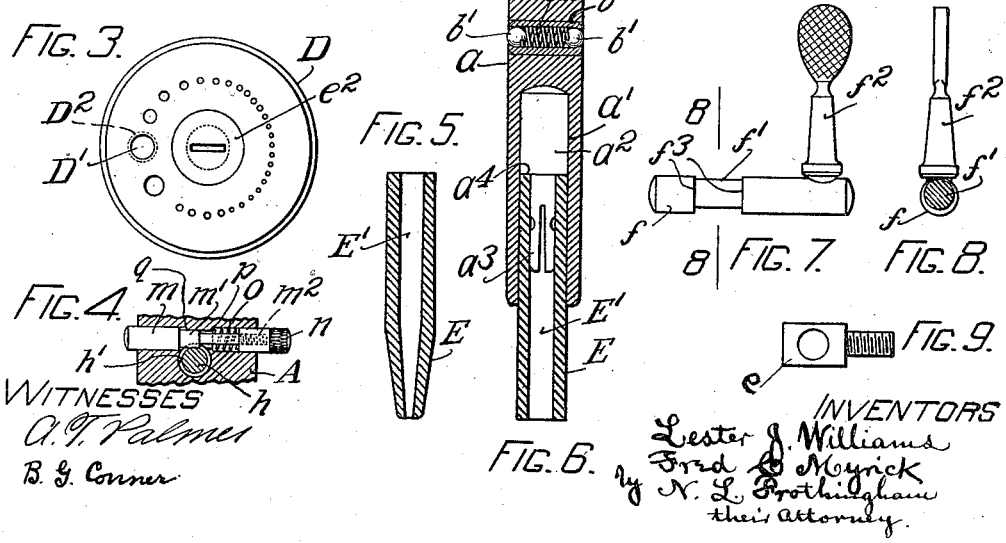

UNITED STATES PATENT OFFICE.

LESTER J. WILLIAMS, OF LEBANON, AND FRED C. MYRICK, OF MANCHESTER, NEW HAMPSHIRE, ASSIGNORS TO KENDRICK & DAVIS COMPANY, OF LEBANON, NEW HAMPSHIRE, A CORPORATION OF NEW HAMPSHIRE.

STAKING-TOOL.

1,045,487.     Specification of Letters Patent.     Patented Nov. 26, 1912.

Application filed May 28, 1908. Serial No. 435,531.

*To all whom it may concern:*

Be it known that we, LESTER J. WILLIAMS and FRED C. MYRICK, both citizens of the United States, residing, respectively, at Lebanon, in the county of Grafton and State of New Hampshire, and Manchester, in the county of Hillsboro and State of New Hampshire, have invented certain new and useful Improvements in Staking-Tools, of which the following is a specification, reference being had therein to the accompanying drawings, which form a part thereof.

The invention relates to staking tools and more particularly to those features thereof relating to the retaining mechanism for the die, and the tool holding devices.

The main object of the invention is to provide a staking tool embodying therein a tool holder adapted to be mounted in the vertical bearing in the gooseneck, and to be so supported as to be held stationary in any desired position.

A further object of the invention is to provide a staking tool embodying a holder forming a part of the tool proper adapted to be slidably mounted in a bearing in the eccentric, and provided with a simple friction device, which will engage the said bearing and retain the holder in any desired position.

A still further object is to provide a staking tool wherein the pivot for the die will be so constructed and arranged as automatically to eject one member of the said pivot when it is released from the other, thus simplifying the removal of the die.

A still further object is to provide a staking tool wherein the base will be adapted to receive any of the tools suitable for use as a stump and support same vertically independently of the die, thus avoiding the necessity for use of the flange now commonly used in stumps, and permitting the use of the ordinary tool or stake as a stump.

A still further object is to provide a staking tool wherein said opening in the base will be provided with an ejector plunger adapted to form an anvil base for the stump, which means will be so constructed and arranged as to be capable of being locked when said plunger is serving as an anvil and be permitted to spring upwardly and eject the stump when it is desired to remove same. And a still further object is to provide a staking tool employing such a stump ejector wherein the opening in the die adapted to receive the stump will be provided with a friction device to act as a brake upon the stump when it is removed by such ejector mechanism.

The invention consists in the novel features of construction and combination of parts hereinafter set forth and described, and more particularly pointed out in the claims hereto appended.

Referring to the drawings: Figure 1 is a side elevation of a staking tool embodying our invention, having portions thereof broken away to disclose the structure and the base die, ejector mechanism and holder. Fig. 2 is a sectional view on the line 2—2 of Fig. 1. Fig. 3 is a plan view of the die. Fig. 4 is a section on the line 4—4 of Fig. 2. Fig. 5 is a detail view of a tool or stake. Fig. 6 is a vertical section on a large scale of the lower end of a tool-holder showing a tool therein. Fig. 7 is a detail view of the locking eccentric for the die. Fig. 8 is a section on the line 8—8 of Fig. 7. Fig. 9 is a detail view of the locking collar for the die. Fig. 10 is a section of a modified form of friction device for the holder, said view being on a much enlarged scale; and Fig. 11 is a detailed view of one of the friction sleeves employed in the friction device shown in Fig. 10.

Like letters refer to like parts throughout the several views.

In the embodiment of our invention shown in the drawings, A denotes a base carrying a gooseneck B supporting a vertical bearing C for the tool-holder. This bearing is arranged eccentrically of the base A and in vertical alinement with any opening in the die D, which is rotatably mounted on said base A. This general arrangement of parts is old and well known in this art, the invention residing in other features of construction utilizing these broad features.

In our present invention we mount a holder *a* in the bearing C, which holder is used as a part of the tool proper and is adapted to receive and retain any short tool or stake in the lower end thereof. The use of a holder common to all the tools or stakes not only reduces the cost of the material in the set of tools, but also of the labor required to produce same.

The holder $a$, as shown in Fig. 6, has its lower end drilled centrally thereof, as at $a'$, the diameter of the base being sufficient to receive the shank of any tool designed for use therein. Seated in said base is a plug $a^2$ provided with means adapted to engage a tool, such means being preferably a split pin $a^3$ adapted to enter and engage an opening in a tool. This plug or seat with the split-pin is forced into the holder and is fitted tightly therein, and always remains in the holder. The elongation of the plug $a^2$ affords sufficient bearing surface to hold the tool firmly, and the shoulder $a^4$ on said plug adjacent to said pin forms a solid hammer head adapted to engage the tool. This split-pin and that part of the plug $a^2$ between the split-pin and the shoulder $a^4$ fit the opening in all the stakes nicely so that the stakes have a bearing inside as well as outside. This construction is more rigid and durable than if the tool were only supported by the walls of the opening in the holder.

In use, it is necessary to watch the work on the die, and to frequently remove the tool therefrom. To avoid the labor and inconvenience of removing the holder $a$ from the bearing C each time it is desired to inspect the work, we provide the said holder with a friction device adapted to engage the bearing C and sustain said holder in any position in which it may be left. In the preferred form of the invention, this device consists of a tube $b$ having its ends closed partly upon the friction balls $b'$, $b'$, which balls are separated and pressed against the bearing C by a spring $b^2$. It will thus be seen that the balls $b'$ are normally pressed outward by the spring $b^2$ with sufficient force to sustain the weight of the holder $a$ and any tool contained therein. By applying the friction device to the holder $a$, we materially simplify the construction of the tool and reduce the cost of production while giving absolute reliability to the device.

In the modification shown in Figs. 10 and 11, instead of employing a friction device, such as above described, we use two nipples $c$, $c'$, a portion of each of which is reduced so as to fit the other, and the end of each of which is closed and rounded so as to project into engagement with the bearing C. The reduced portion has an elongated slot therein, as $c^2$, a pin $c^3$ passing through the holder $a$, and said slots serving to hold said device in the holder and permit that slight lateral movement necessary to mount the holder in the bearing C. These tubes are pressed outwardly by a spring $c^4$, mounted within them. As it is necessary to hammer the holder $a$, and when the said holder is common to a number of tools it is desirable to avoid wear thereon as much as possible, we provide the holder $a$ with a hardened steel top peg $d$ projecting beyond the body of said holder and fitted nicely thereto.

The die D is pivotally mounted upon the base A by means of a collar $e$ having a screw-threaded stem $e'$ adapted to be engaged by a screw-nut $e^2$, the head of which enters a countersink in the said die. To facilitate the substitution of dies, we mount a spring $e^3$ between the screw-nut $e^2$ and the screw-threaded stem $e'$ so that, as the nut $e^2$ is unscrewed, the spring $e^3$ will force it upwardly away from the collar $e$; this spring $e^3$ also serves to hold the adjustment of the clamping mechanism of the die D so that it will not change when the die is revolved. Passing through the base A is a spindle $f$ having a reduced portion $f'$ at some point thereof, and a lever-handle $f^2$. The reduced portion $f'$ is arranged eccentrically of the spindle $f$ so that by turning said spindle, the said portion $f'$ will act as a cam to draw down or raise the collar $e$ on nut $e^2$ to bind or release the die D. The reduced portion $f'$ forming the cam forms oppositely disposed shoulders $f^3$ adapted to engage the collar $e$ and prevent the removal of the said spindle.

The die D, shown in Fig. 3, is of the usual and well-known construction, having a plurality of graduated openings therein to adapt the die to different classes of work. The opening $e^4$ through the base A, in which the collar $e$ and screw-nut $e^2$ are seated, extends entirely through the base so as to allow that vertical movement of these parts necessary to accomplish the clamping of said die against the upper face of said base. Extending through the base A on a radius the same as that of the various die openings, is a vertical opening $g$, in which is seated the stump supporting and ejecting mechanism. This mechanism comprises a cylindrical plunger $h$, capable of vertical movement in the opening $g$ and normally pressed upwardly by a spring $i$ bearing on the under side thereof, and passing through an adjustable stop screw $j$. The bottom of the opening $g$ is closed by a set-screw $k$, which serves to hold the spring $i$ in place, and acts as a set-screw relative to the screw $j$. To overcome the tension of the spring $i$ when a stump is being used in the tool, I provide locking means for the plunger $h$ and preferably make said locking means automatic so that the mere positioning of the stump in the die and base will set said locking mechanism and the partial ejection of said stump will result from the release of said locking mechanism. This mechanism comprises a channel $h'$ extending about the plunger $h$ horizontally, which channel is preferably concaved. Passing through the base A is a cylindrical bore of a diameter substantially the same as that of the concave channel $h'$, and seated in said bore is a spindle $m$ having a reduced portion $m'$ adapted to enter said channel $h'$ and a screw-threaded end $m^2$, of a smaller diameter than the portion $m'$; an operating handle $n$ mounted upon said set-screw end $m^2$, and a spring $o$ seated between a spring-seat $p$ formed in the base A and the said operating handle $n$, which handle is in the form of a push-button. The spring $o$, it will be observed, acts to normally project the handle $n$ and bring the portion $m'$ into engagement with the plunger $h$. A similar shoulder $q$ is formed within the bore in a relation to engage the spindle $m$ and limit the extent of projection of said spindle and the parts carried thereby by the spring $o$.

In Fig 1 of the drawings, we have shown one form of tool or stake, and in Figs. 2, 5, and 6, other forms of such tools or stakes, all having this similarity in their construction, to wit,—that one end thereof has a bore therein of a diameter adapted to fit over and be engaged by the retaining means, as the split-pin $a^3$ carried in the holder $a$. This feature is present irrespective of the character of the work-end of the tool, although in some tools as that shown in Figs. 2, 5, and 6, this bore extends entirely through the tool axially. In each of the figures, we have indicated the tool at E, and the bore thereof at E'. The large opening D' in the die D is especially adapted for use with stumps, and we, therefore, to prevent the ejector mechanism from throwing the stump entirely from the die, provide said opening with a friction ring $D^2$. The plunger $h$, screw $j$ and set screw $k$ are each provided with a central longitudinal opening, which openings are concentric with each other and concentric with the opening in the bearing C whereby a continuous channel is provided from top to bottom. This construction permits the small watch parts, staffs, pins, etc. to fall down through after being driven out. We provide the base A with a screw-threaded socket in which a key F, adapted to actuate the screw-nut $e^2$ may be screwed, to conveniently attach said key to the tool.

The operation of the herein described staking tool is substantially as follows: The desired tool or stake E being selected, it is inserted into the holder, over the split-pin $a^3$ and pushed up against the seat $a^4$, the split-pin $a^3$ acting as a frictional device to hold the tool or stake in place. The holder $a$ is then inserted in the bearing C, the spring $b^2$, in the preferred form of friction device, or $c^4$ in the modified form, yielding sufficiently to permit the balls $b'$ or the sleeves $c$ to recede within said holder sufficiently to permit the holder to be so inserted and subsequently exert that outward pressure necessary to sustain the weight of the holder and tool by frictional engagement with the inner surface of said bearing. The die D is then turned until the desired opening therethrough is alined with the opening $g$ and bearing C. Thereupon, the spindle $f$ is turned about 45 degrees by the lever handle $f^2$, the eccentric portion $f'$ thereof drawing the collar $e$ and screw-nut $e^2$ downward and clamping said die against the base. While the friction device in the holder $a$ will sustain the holder in any desired position in the sleeve or bearing A, the spring therein will not exert sufficient pressure to prevent the free movement of the holder in either direction, so that the holder and the tool or stake carried thereby may be brought down upon the work or raised therefrom for purposes of inspection as required. When raised, the holder may be released, the friction device holding it in the raised position so as to permit both hands to be used for shifting the work, or substituting one part for another on the die D. The top peg $d$, being fitted snugly to the top of the holder, will stand all of the blows in the use of the tool without spreading, thus increasing the life of the holder and avoiding any necessity for tempering the entire holder, and those inaccuracies resulting from such. When it is desired to change a tool, it is merely necessary to remove the tool or stake E from the split-pin $a^3$ and substitute another tool therefor. Many of the tools or stakes may be used as stumps, also, if desired, thus making it possible to have a full set of tools and stumps with a much smaller number of parts than is required when the tools and stumps differ essentially in their construction as is the case in the usual and well-known style of staking tools. To use any tool or stake E as a stump, it is merely necessary to bring the opening D' of the die D into alinement with the opening $g$ and bearing C and clamp the die in position and insert the tool or stake through said openings until it engages the plunger $h$ and thereafter forcing said plunger downwardly until the channel $h'$ is alined with the spindle $m$. The spring $o$ will, when the parts are so positioned, force the reduced portion $m'$ into said channel and lock the plunger in this position. After the die has been clamped as above stated any number of stakes or tools can be used one after the other without changing the position of the die. While, if desired, the spindle $m$ may be relied upon to absorb any shocks upon the plunger $h$ from the stump, we prefer that the parts be adjusted so that all the shocks will come upon the plunger $h$, the screw $j$ and set screw $k$. The locking action of the spindle $m$ is entirely automatic. When it is desired to remove the stump, the operating handle or button is pressed inwardly against the tension of the spring $o$, forcing the portion $m'$ out of the channel $h'$ and permitting the spring $i$ to raise the plunger $h$ and with it the stump. The friction ring $d^2$ will prevent the stump flying entirely out of the die, and the plunger $h$ will be retained in its bearing through its engagement with the bottom of the die D. The spindle $m$ will be held preparatory to its next operation through the engagement of the portion $m'$ with the plunger $h$ below the channel $h'$. The set-screw $k$ locks the stop-screw $j$ and acts as a seat for the spring $i$.

It will be observed that by using tools or stakes and stumps having long stems, sufficient bearing surfaces are provided to secure the desired accuracy in the tool, and also avoid special flanges to absorb shocks on the stumps by transmitting them to the die D. This feature assumes considerable importance in a tool wherein extreme accuracy and precision is an essential feature.

It is not our intention to limit the invention to the details of construction shown in the accompanying drawings, it being apparent that such may be varied and still retain all of the essential characteristics of our invention as defined in the following claims.

Having described the invention, what we claim as new and desire to have protected by Letters Patent is:—

1. In a staking tool, the combination with a base, a die having an opening therein mounted upon said base, and a bearing alined with the opening in said die, of a tool holder slidably mounted in said bearing, having openings in the opposite sides thereof, laterally movable friction members mounted in said openings and adapted to project beyond said holder and frictionally engaging the inside of said bearing and a spring disposed in said opening between said members whereby said members are forced into engagement with said bearing.

2. In a staking tool, the combination with a base, a die and a bearing of a holder carrying a tool or stake mounted in said bearing, a sleeve having reduced ends carried by said holder, a plurality of friction balls mounted in said sleeve and projecting in part through said reduced ends thereof, and a spring projecting said balls from said sleeve.

3. In a staking tool, the combination of a base having an opening therein, a die, means rotatably mounting said die on said base comprising a collar carrying a screw, a screw-nut adapted to engage said die and said screw, and a spring between said collar and said screw-nut, an eccentric mounted in said collar, and an operating handle for said eccentric exposed exteriorly of said base, whereby said die may be locked against said base.

4. In a staking tool, the combination with a base, a die, a bearing and a holder carrying a tool or stake mounted in said bearing, of a stump retaining and ejecting mechanism comprising a plunger seated in an opening below said bearing, a spring acting to normally raise said plunger, a seat for said spring and means whereby said plunger may be locked when depressed, and released, as desired, to eject a stump from said opening.

5. In a staking tool, the combination with a base, a die, a bearing and a holder carrying a tool or stake mounted in said bearing, of a stump retaining and ejecting mechanism comprising a plunger seated in an opening below said bearing, a spring acting to normally raise said plunger, a seat for said spring, a laterally removable locking member adapted to engage said plunger when it is depressed, and a spring acting on said member whereby it will automatically engage said plunger and said locking member may be reciprocated against the tension of said spring to release said member.

6. In a staking tool, the combination with a base, a die, a bearing and a holder carrying the tool or stake mounted in said bearing, of a stump retaining and rejecting mechanism comprising a plunger seated in an opening below said bearing, a spring acting to normally raise said plunger, a seat for said spring, said plunger having a horizontal channel thereabout, a laterally extended spindle mounted in said base, said spindle having a reduced portion adapted to enter said channel, a screw-threaded stem, and an operating handle or button exposed exteriorly of said base, and a spring acting upon said handle or button, whereby said spindle will be automatically reciprocated to lock said plunger in the depressed position, and said spindle may be reciprocated to disengage said reduced portion from said channel.

In witness whereof, we have hereunto affixed our signatures in the presence of two witnesses this 23rd day of May, 1908.

LESTER J. WILLIAMS.
FRED C. MYRICK.

Witnesses:
  CHARLES E. FOSTER,
  HARRY T. LORD.